US00RE40337E

(19) United States
(12) Reissued Patent
Sedov

(10) Patent Number: US RE40,337 E
(45) Date of Reissued Patent: May 27, 2008

(54) THERMAL SPRAY GUN WITH IMPROVED THERMAL EFFICIENCY AND NOZZLE/ BARREL WEAR RESISTANCE

(75) Inventor: Victor Sedov, Franklin, NH (US)

(73) Assignee: Tafa, Incorporated, Concord, NH (US)

(21) Appl. No.: 09/790,585

(22) Filed: Feb. 23, 2001

Related U.S. Patent Documents

Reissue of:
(64) Patent No.: 6,003,788
Issued: Dec. 21, 1999
Appl. No.: 09/078,960
Filed: May 14, 1998

(51) Int. Cl.
*B05B 15/00* (2006.01)

(52) U.S. Cl. ..... 239/397.5; 239/79; 239/81; 239/132; 239/139; 239/591

(58) Field of Classification Search ..... 239/397.5, 239/79, 81, 128, 132, 132.1, 135, 139, 591
See application file for complete search history.

(56) References Cited

U.S. PATENT DOCUMENTS 1,968,992 A * 8/1934 Conkling ..... 91/44
2,610,092 A * 9/1952 Thompson ..... 299/140.1
3,722,821 A * 3/1973 Jaeger et al. ..... 239/591 X
4,280,662 A * 7/1981 Erickson et al. ..... 239/591 X
4,464,414 A * 8/1984 Milewski et al. ..... 427/37
4,937,417 A * 6/1990 Fox ..... 219/76.1
4,978,557 A * 12/1990 Drake et al. ..... 427/37
4,986,477 A * 1/1991 Roman ..... 239/455
4,992,337 A * 2/1991 Kaiser et al. ..... 428/642
5,017,757 A * 5/1991 Kawai et al. ..... 219/130.51
5,066,513 A * 11/1991 Zurecki et al. ..... 427/37
5,109,150 A * 4/1992 Rogers ..... 219/121.47
5,143,139 A * 9/1992 Leatham et al. ..... 164/46
5,145,710 A * 9/1992 Quadflieg et al. ..... 427/34
5,148,990 A * 9/1992 Kah, Jr. ..... 239/222.17
5,191,186 A * 3/1993 Crapo, III et al. ..... 219/76.16
5,194,304 A * 3/1993 McCune, Jr. et al. ..... 427/449
5,285,967 A * 2/1994 Weidman ..... 239/80
5,442,153 A * 8/1995 Marantz et al. ..... 219/121.47
5,466,906 A * 11/1995 McCune, Jr. et al. ... 219/121.47
5,468,295 A * 11/1995 Marantz et al. ..... 118/723 DC
5,575,423 A * 11/1996 Yuen ..... 239/397.5
5,761,907 A * 6/1998 Pelletier et al. ..... 239/397.5 X
5,834,066 A * 11/1998 Kunzli et al. ..... 239/79 X
6,042,019 A * 3/2000 Rusch ..... 239/85

OTHER PUBLICATIONS

Goodfellow–Tungsten Carbide/colalt Material Information, Internet document, www.goodfellow.com.*
Goodfellow Material Information for Copper, internet document, www.goodfellow.com.*

* cited by examiner

*Primary Examiner*—Dinh Q. Nguyen
(74) *Attorney, Agent, or Firm*—Gerald L. Coon

(57) ABSTRACT

The present invention discloses a thermal spray apparatus with improved thermal efficiency and wear resistance in both the nozzle and barrel combustion chamber. Specifically, disclosed herein is a thermal spray apparatus for spraying substrate coatings, comprising a high velocity oxygen fuel (HVOF) gun wherein said gun includes a combustion chamber generating heated flow therefrom and a nozzle downstream from said chamber. The nozzle and/or chamber contain a first layer of material heated by the flow, and a second layer of material which contacts the first layer when said first layer is heated. The first layer has a thermal conductivity that is lower than said second layer and preferably a lower thermal expansion coefficient. In use, the contact of the first heated layer of material with the second layer operates to remove heat from the first layer therein providing automatic/self-regulating temperature control of the HVOF apparatus.

36 Claims, 2 Drawing Sheets

THERMAL SPRAY GUN WITH IMPROVED THERMAL EFFICIENCY AND NOZZLE/ BARREL WEAR RESISTANCE

Matter enclosed in heavy brackets [ ] appears in the original patent but forms no part of this reissue specification; matter printed in italics indicates the additions made by reissue.

FIELD OF THE INVENTION

This invention relates to a thermal spray device, and more particularly, to a high velocity thermal spray gun providing improved thermal efficiency (lower heat losses that are self-regulating) in both the nozzle and combustion chamber along with increased durability of the hardware employed therein.

BACKGROUND OF THE INVENTION

Thermal spraying was initiated as early as 1910 when a stream of molten metal was poured into the path of a high pressure gas jet causing metal droplets to spray in a conical pattern onto an adjacent substrate to immediately freeze and form a coating of deformed particles in a lamella structure. Today, there are essentially two types of thermal spraying that use wire feedstock: combustion flame spraying and electric are spraying.

In electric-arc (two wire) spray coating, two consumable wires form electrodes of an electric arc or "arc ball". The two wires are electrically energized and converge at a point in which the electric arc is formed. A stream of compressed atomizing gas is passed through the converging point to atomize the molten material and drive a molten metal particle stream formed by the electric arc along an axis forward of the converging zone.

Various prior patents discuss electric-arc spray systems, noteworthy of which include U.S. Pat. No. 1,968,992 (apparatus for coating surfaces), U.S. Pat. No. 2,610,092 (spray discharge nozzle), U.S. Pat. No. 4,464,414 (method for spraying metallic coatings), U.S. Pat. No. 4,992,337 (electric arc spraying of reactive metals); U.S. Pat. No. 5,066,513 (method of producing titanium nitride coatings by electric arc thermal spray); U.S. Pat. No. 4,937,417 (metal spraying apparatus); U.S. Pat. No. 4,98,557 (method of arc spraying); U.S. Pat. No. 4,986,477 (spray gun with adjustment of the shape of the jet); U.S. Pat. No. 4,992,337 (electric arc spraying of reactive metals); U.S. Pat. No. 5,017,757 (pulsed arc welding machine); U.S. Pat. No. 5,109,150 (open-arc plasma wire spray method and apparatus); U.S. Pat. No. 5,143,139 (spray deposition method and apparatus); U.S. Pat. No. 5,145,710 (method and apparatus for applying a metallic coating to threaded end sections or plastic pipes and resulting pipe); U.S. Pat. No. 5,148,990 (adjustable arc spray and rotary stream sprinkler); U.S. Pat. No. 5,191,186 (narrow beam arc spray device), U.S. Pat. No. 5,194,304 (method of thermally spraying solid lubricant onto a metal target), U.S. Pat. No. 5,442,153 (high velocity electric-arc spray apparatus and method of forming materials); U.S. Pat. No. 5,466,906 (process for coating automotive engine blocks) and U.S. Pat. No. 5,468,295 (apparatus and method for thermal spray coating of interior surfaces).

In combustion flame spraying, high velocity oxygen fuel (HVOF) flame spraying is a method of applying materials to a variety of heat resistant surfaces. Developed on or about 1981, HVOF has proven to be a highly efficient and effective method of coating, relying upon exit gas velocities of about 4,000 to 5,000 feet per second. The process required burning fuels such as propylene or kerosene with oxygen under high pressures up to about 300 pounds per square inch in an internal combustion chamber. Hot exhaust gases discharge from the combustion chamber through exhaust ports and expand into an extended nozzle. Powders of metals or ceramic materials are fed into the nozzle and confined by the exhaust gas stream until the particle exits at the nozzle in a high speed jet stream. The particle jet stream produces a more dense coating than coatings produced with low velocity powder flame spraying techniques. Recently, in U.S. Pat. No. 5,285,967, HVOF guns have been disclosed which are said to produce a high speed gas velocity and high speed particle velocity of from about 1000 to 1800 feet per second, while simultaneously producing a low temperature gas stream having an adjustable powder feed and temperature range from about 150° F. to 750° F. to properly preplasticize polymers and obtain optimal temperature for the thermoplastic polymer melt.

In all of the above prior art designs, however, a single material has been routinely employed for both the barrel and nozzle chamber of the guns. For example, copper, due to its high thermal conductivity, is currently one of the most popular materials for both the barrel and nozzle sections of many HVOF water-cooled designs. Copper is desirable from the point of view that with such high thermal conductivity, cooling will be more efficient, and problems of overheating will be avoided. In addition, as the outer surface of the nozzle is sealed with o-rings to a water cooling jacket, copper, due to its high thermal conductivity, will not melt the o-rings, thereby preventing down-time and refitting of o-ring seals.

However, the high thermal conductivity of copper comes at a price. That is, copper is relatively soft, and wear problems are common, particularly when making use of carbides and other hard powders for the resulting thermal spray. In addition, the high thermal conductivity of copper results in a relatively low inner surface temperatures in either the gun chamber or nozzle section. This corresponds to low thermal efficiency of the overall process due to such heat losses, resulting in low deposition rates and deposition efficiency as well as limiting the ability to spray high temperature materials.

The deficiencies of copper have been considered and gave rise to the us of high temperature alloys (stainless steel, nickel, nickel based super alloys, etc.). These materials have lower thermal conductivity than copper and higher wear resistance. From this standpoint they are more attractive than copper and would allow for higher temperatures to be realized on the inner walls of the barrel and nozzle. However, high temperature alloys also introduce some additional problems.

First, high temperature alloys still require one to manufacture relatively thick walls (not less than 0.635 cm) to create the proper thermal resistance for heal, transfer of the combustion products to the outer cooling (water) jacket. However, the low thermal conductivity of these materials give rise to problems with the o-rings attached to the outer surfaces thereof. That is, due to the low thermal conductivity, the high temperature alloys can overheat the o-rings and cause o-ring failure.

Finally, ceramic materials have also been considered. These materials typically have lower thermal conductivities than copper, with better wear resistance. In addition, ceramics offer higher working temperatures than high temperature alloys. However, once again, due to the relatively low thermal conductivities of these materials compared to copper, ceramic materials have similar problems associated and reviewed above. In addition, ceramic materials have their own peculiar problems, such as being relatively brittle. Furthermore, as the thermal expansion properties of ceramics are different than that of the surrounding metal components, cracks are commonly observed in the heating cycle thereby further complicating HVOF design.

Accordingly, as can be seen from the above, there has been a long-standing need to improve the thermal efficiency of the HVOF apparatus and process, while at the same time providing increased durability of the hardware employed therein. That being the case, it is a primary object of the present invention to develop a HVOF gun design and process that insures lower heat loss along with high durability, thereby offering higher deposition rates and deposition efficiency, as well as the ability to spray higher temperature materials, than has been previously available in the HVOF designs of the prior art.

SUMMARY OF THE INVENTION

A thermal spray apparatus with improved thermal efficiency and wear resistance for spraying substrate coatings comprising a high velocity oxygen fuel (HVOF) gun for spraying wherein said gun includes a combustion chamber generating heated flow therefrom and a nozzle downstream from said chamber, said nozzle and/or chamber comprising a first layer of material heated by said flow, and a second layer of material which contacts said first heated layer of material, said first layer having a thermal conductivity lower than said second layer.

In method form, the present invention comprises a method for automatically controlling heat losses from an HVOF thermal spray apparatus containing a combustion chamber and a nozzle downstream from and in flow communication with said combustion chamber for receiving a heated HVOF stream therefrom comprising positioning a first layer of material in said combustion chamber or said nozzle with a thermal conductivity "x" and positioning a second layer of material in said combustion chamber or said nozzle in non-contacting relationship with said first layer, said second layer having a thermal conductivity "y", wherein $x<y$. This is followed by heating the first layer so that said first layer contacts said second layer and said second layer removes heat from said first layer into said second layer whereupon said first layer returns to said non-contacting position. Accordingly, continuous heating causes said first and second layers to cycle through a plurality of non-contacting and contacting heat removal positions for self-regulation of said HVOF apparatus temperature.

DETAILED DESCRIPTION OF THE PREFERRED EMBODIMENTS

Figure 1:
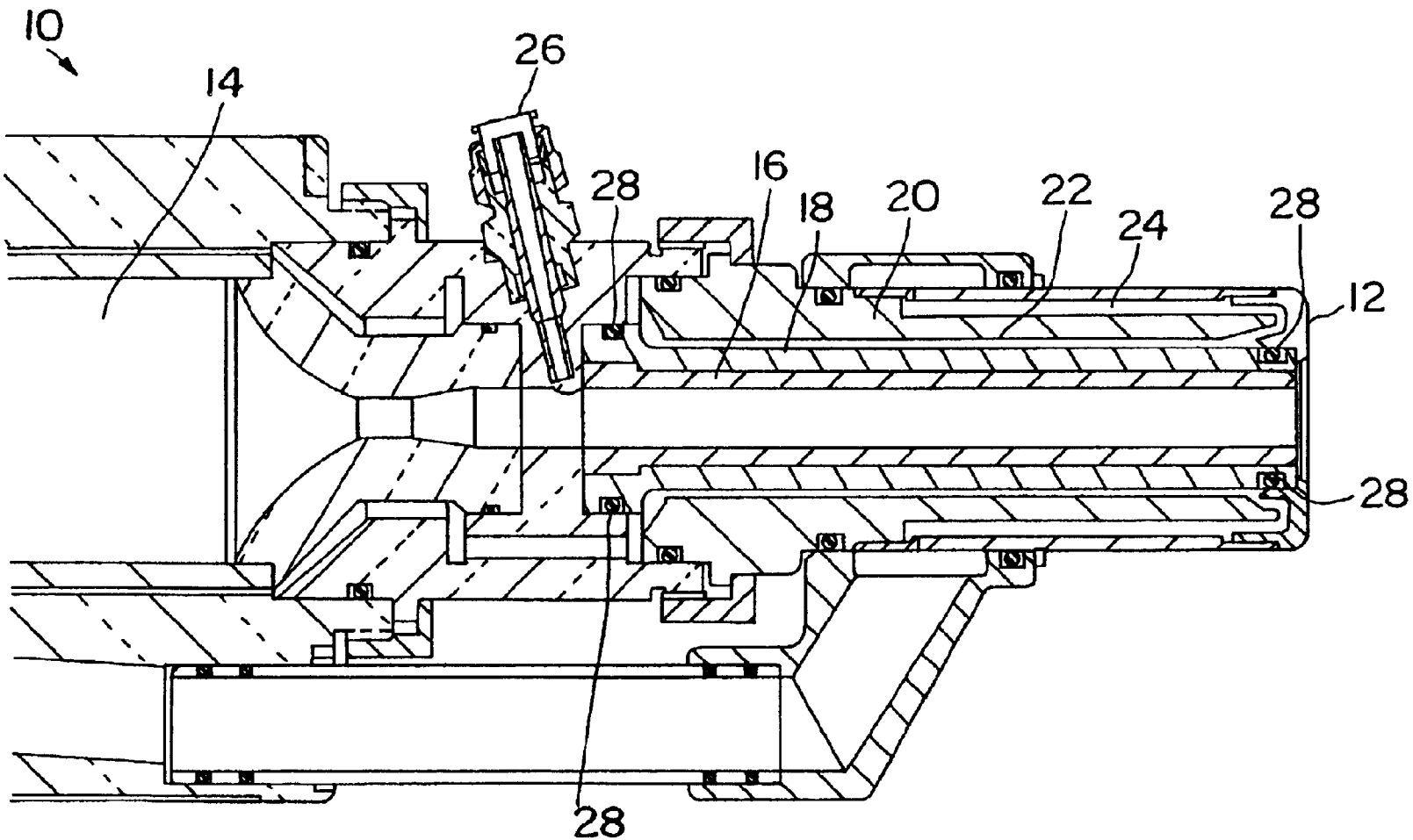
FIG. 1 is a cutaway view of an HVOF apparatus of the present invention employing a low thermal conductivity insert with a higher thermal conductivity sleeve surrounding said insert in the nozzle section thereof.

Referring now to the drawings, FIG. 1 shows a preferred HVOF spray gun apparatus 10 of the present invention. The apparatus 10 includes a generally cylindrical shaped elongated nozzle section 12 and a combustion chamber section 14. The nozzle section 12 contains a first layer of material 16 and second insert layer of material surrounding said first layer thereof. As previously noted, first layer 16 has a thermal conductivity that is lower than the thermal conductivity of said second layer 18. Accordingly, those materials that comply with such thermal conductivity differential critcrion and which are suitable to meet the other general design requirements of an HVOF apparatus fall directly within the broad context of the present invention.

Preferably, however, first layer 16 is selected from the group of high temperature wear resistant alloy materials, such as stainless steel, nickel, nickel based super alloys, etc. In addition, second layer 18 is preferably made from copper, silver, aluminum, brass and/or bronze. However, first layer 16 can also be manufactured from ceramic type materials, such as SiC, BeO, etc. But as just noted, in the broad context of the present invention, selection is made to satisfy the condition that the thermal conductivity of the first layer is lower than that of the second layer. Accordingly, those skilled in the art will appreciate that the specific preferred materials recited above for the first layer could very well comprise the second layer, and vice versa, depending upon the particular situation and HVOF system requirements at issue.

In addition, as noted, it is preferable that the first layer is more wear resistant than said second layer, or in other words, provides a harder surface thereof as measured by, e.g. Vickers Hardness (HV) values. In that regard, the first layer preferably indicates a hardness of at least about 400 HV, such as that supplied by an austenitic alloy.

Accordingly, in preferred embodiment, when the first layer comprises stainless steel, such is far more durable with respect to the use of carbides and other hard powder type materials in the HVOF gun. That being the case, when such hard and durable materials are placed in the nozzle section, they will not wear quickly and disrupt the geometry of the HVOF flow as it exists the device.

However, up until this point in time, the use of stainless steel alone (with its relative low thermal conductivity) as the material in the nozzle section thereof has been found to result in overheating of the steel during spraying, such that any o-rings attached to the stainless steel for sealing with the surrounding fluid-cooling chamber would melt and fail. Accordingly, in the present invention, such problem has been completely eliminated, as the stainless steel in the nozzle section is no longer in contact with cooling fluid, and therefore does not require o-ring sealing.

Furthermore, while preferably, and as shown, the first layer 16 is surrounded by second layer 18, it has been found particularly preferred to add the condition that the first layer also maintains a lower thermal expansion factor than the material of the second layer, and that the first layer is slightly smaller in outer diameter than the inner diameter of the second layer (at room temperature), so that at room temperature, it is not in contact with said second layer, and can be conveniently replaced. Along such lines, the gap or space between said first and second layer is preferably about 0.001–0.010 inches. More preferably the gap is in the range of 0.002–0.006 inches, or even 0.002–004 inches, and in a most preferred embodiment the gap is set to the more specific value of about 0.002 inches.

In that regard, it can be appreciated that the present invention provides what can be considered as a self-regulating heat dissipating structure that affords increased thermal efficiency (temperature control) and durability over prior art designs. That is, without being bound by any particular theory, in preferred embodiment, when the thermal conductivity and thermal expansion of the first layer are less than that of the second layer, and the first layer does not contact the second layer at room temperature, upon heating, the first layer inner wall, in contact with the combustion products of the HVOF process will rise in temperature, and at such time, the first layer itself will expand and come in contact with the second layer, which second layer, having higher thermal conductivity, efficiently removes heat from the first layer, causing said first layer to shrink slightly in diameter. Accordingly, such contact/shrinking episode will occur regularly and repeatedly during spraying to thereby maintain higher temperatures in the nozzle and higher HVOF jet temperatures than available in prior art designs. In addition, deposition efficiency and the quality of the coating is improved.

Stated another way, in the context of the present invention, the thermal conductivities of the first and second layers, along with the thermal expansion coefficients, along with the size of the gap or space between said layers, are all selected to provide and optimize the heat removing process described above. In addition, such variables are selected to achieve a desired temperature in the nozzle or combustion chamber, as well as to optimize heat removal or cooling characteristics.

Also shown in FIG. 1, at 20, 22 and 24 can be seen the water jacket, water duct and outlet water duct respectively of the nozzle section 12. At 26 is seen a port for introducing coating material, usually in powdered form, into the HVOF gas stream downstream from the combustion chamber. Furthermore, indicated at 28 arc the various o-rings.

Accordingly, a side-by-side comparison was run as between a HVOF gun made in accordance with the nozzle design shown in FIG. 1, and a standard HVOF gun of the prior art employing copper as the sole material of construction in the nozzle section thereof. Specifically, the temperatures of the water entering and exiting the water jacket 20 (delta T) was measured. The results are summarized below in Table I.

TABLE 1

| Fuel (gal/hr) | $O_3$ (item/hr) | Standard HVOF Delta T (° F.) | FIG. 1 HVOF Delta T (° F.) |
|---|---|---|---|
| 7.0 | 55000 | 61 | 56 |
| 7.7 | 40000 | 46 | 38 |
| 7.0 | 36000 | 40 | 36 |

As can be seen from the above, the values of delta T of the device of FIG. 1 containing a first layer 16 made of stainless steel, and a second layer 18 of copper, are significantly lower than those of a comparable design contain a single layer of copper in the nozzle section thereof. That being the case, it is clear that the novel two layer design disclosed herein provides an HVOF jet that more efficiently contains the heat in the jet emerging from the gun on the order of about 5–10% over single layer construction. Stated another way, the nozzle design of FIG. 1 looses less heat from the nozzle section thereof compared to nozzle designs of the prior art, and the quality of coatings are improved.

In addition, it can be appreciated that in the context of the present invention, one can also control the surface areas ultimately in contact with one another as between first layer 16 and second layer 18 as shown in FIG. 1. That is, by controlling the amount of surface in eventual (heated) contact between the two surfaces in the nozzle or combustion chamber, one can effectively fine tune the self-regulating temperature dissipation mechanism noted above. In such context, grooves or other similar modifications can be created on layers 16 and 18, such that when layer 16 is heated and expands, and comes into contact with layer 18, heat is promptly transferred and removed into layer 18. However, less heat will be removed or absorbed by layer 18 should the actual area of contact be reduced, and rates of thermal expansion.

Figure 2:
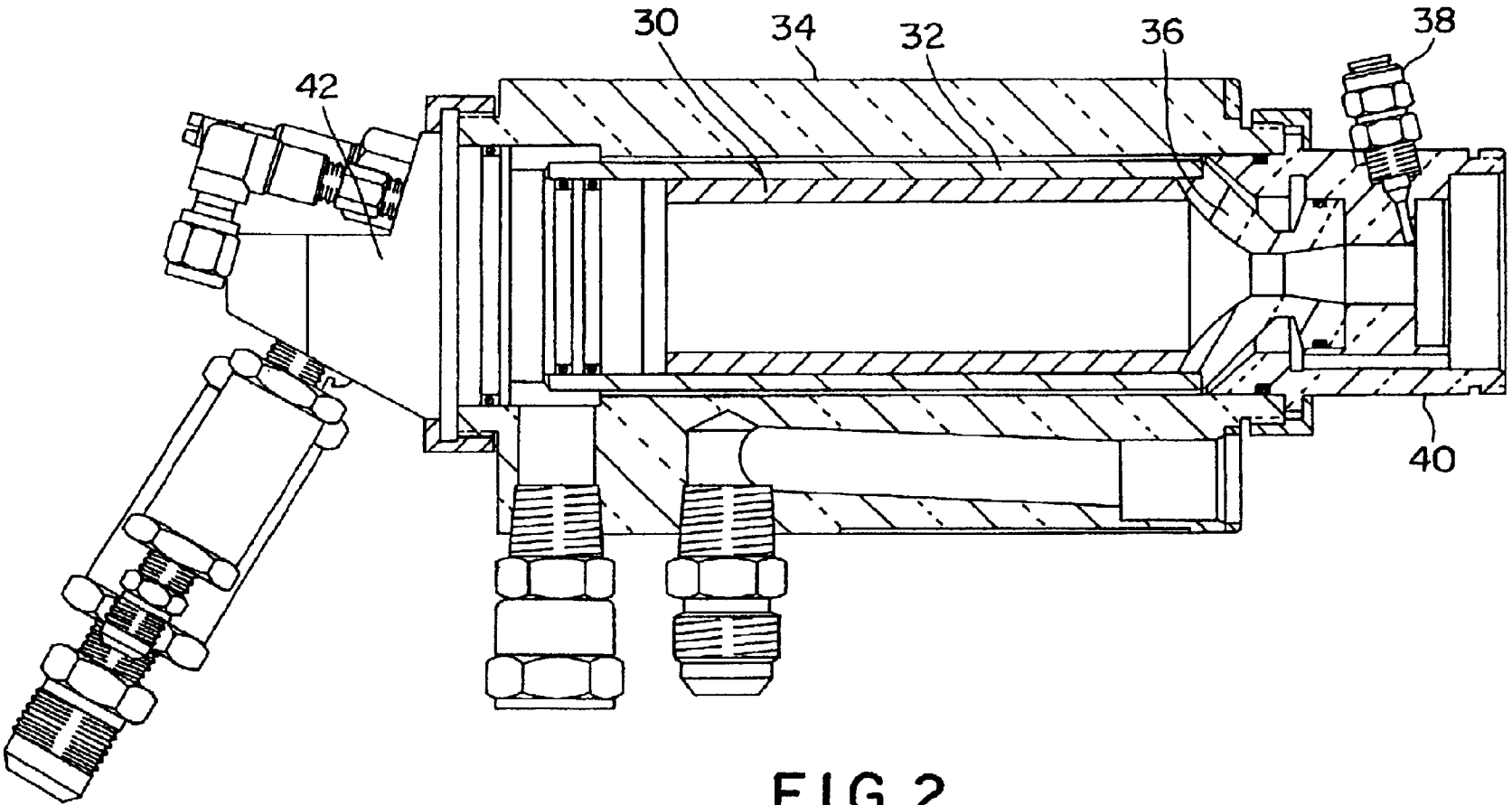
FIG. 2 is a cutaway view of an HVOF apparatus of the present invention, employing a low thermal conductivity insert with a higher thermal conductivity sleeve surrounding said insert in the combination chamber thereof.

As illustrated in FIG. 2, an alternative embodiment of the present invention is shown wherein a low thermal conductivity insert 30 is positioned as the first layer in the combustion chamber. The second layer in the combustion chamber 32 is, in accordance with the present invention, spaced apart from the first layer 30, in a manner similar to the description above for the nozzle section. In addition, as seen in FIG. 2, at 34 is the combustion chamber casing, at 36 is the throat section leading to the nozzle section, at 38 can be seen a powder port, and 40 an interconnector for nozzle attachment, and at 42 a stabilizer.

The foregoing detailed description is given primarily for clearness of understanding and no unnecessary limitations are to be understood therefrom, for modification will become obvious to those skilled in the art based upon more recent disclosures and may be made without departing from the spirit of the invention and scope of the appended claims.

I claim:

1. A thermal spray apparatus with improved thermal efficiency and wear resistance for spraying substrate coatings comprising:

a high velocity oxygen fuel (HVOF) gun for spraying wherein said gun includes a combustion chamber generating heated flow therefrom and a nozzle downstream from said chamber, said nozzle and/or chamber comprising a first layer of material heated by said heated flow, and a second layer of material which contacts said first heated layer of material, said first layer having a thermal conductivity lower than said second layer.

2. The apparatus of claim 1, wherein said first layer has a thermal expansion coefficient "a" and said second layer has a thermal expansion coefficient "b" wherein a<b.

[3. The apparatus of claim 1, wherein, at room temperature, said first layer and said second layer are spaced apart from one another.]

4. The apparatus of claim 3, wherein said first layer and said second layer are spaced apart about 0.001–0.010 inches.

5. The apparatus of claim 3 wherein said spacing is about 0.002–0.006 inches.

6. The apparatus of claim 3 wherein said spacing is about 0.002–0.004 inches.

7. The apparatus of claim 3 wherein said spacing is about 0.002 inches.

8. The apparatus of claim 1, wherein said first layer is selected from the group consisting of stainless steel, nickel, a nickel based alloy, a ceramic material, and a mixture thereof, and said second layer is selected from the group consisting of copper, silver, aluminum, brass, bronze, and a mixture thereof.

9. The apparatus of claim 1, wherein said first layer has a hardness value of at least about 400 HV.

10. The apparatus of claim 1 wherein said second material which contacts said first heated layer removes heat from said first layer into said second layer.

11. A method for self-regulating heat losses from an HVOF thermal spray apparatus containing a combustion chamber and a nozzle downstream from and in flow communication with said combustion chamber for receiving a heated HVOF stream therefrom comprising:

positioning a first layer of material in said combustion chamber or said nozzle with a thermal conductivity "x", positioning a second layer of material in said combustion chamber or said nozzle in non-contacting relationship with said first layer, said second layer having a thermal conductivity "y", wherein x<y;

heating said first layer so that said first layer contacts said second layer and said second layer removes heat from said first layer into said second layer, whereupon said first layer returns to said non-contacting position.

12. The method of claim 11, wherein the first layer has a thermal expansion coefficient that is less than said second layer.

13. The method of claim 11 wherein said heating causes said first and second layers to cycle through a plurality of said non-contacting and contacting heat removal positions.

*14. A nozzle for use with a high velocity oxygen fuel (HVOF) gun of a thermal spray apparatus and for generating a heated flow, the nozzle having a first layer of material heated by said heated flow, and a second layer of material which contacts said first heated layer of material, said first layer having a thermal conductivity lower than said second layer for spray coatings with improved thermal efficiency and wear resistance, and wherein at room temperature, said first layer and said second layer are spaced apart from one another.*

*15. The nozzle of claim 14 wherein said first layer has a thermal expansion coefficient "a" and said second layer has a thermal expansion coefficient "b" wherein a<b.*

*16. The nozzle of claim 14 wherein said first layer and said second layer are spaced apart about 0.001-0.010 inches.*

*17. The nozzle of claim 14 wherein said spacing is about 0.002-0.006 inches.*

*18. The nozzle of claim 14 wherein said spacing is about 0.002-0.004 inches.*

*19. The nozzle of claim 14 wherein said spacing is about 0.002 inches.*

*20. The nozzle of claim 14 wherein said first layer is selected from the group consisting of stainless steel, nickel, a nickel based alloy, a ceramic material, and a mixture thereof, and said second layer is selected from the group consisting of copper, silver, aluminum, brass, bronze, and a mixture thereof.*

*21. The nozzle of claim 14 wherein said first layer has a hardness value of at least about 400 HV.*

*22. The nozzle of claim 14 wherein said second material which contacts said first heated layer removes heat from said first layer into said second layer.*

*23. A method for self-regulating heat losses from an HVOF thermal spray apparatus containing a combustion chamber and a nozzle downstream from and in flow communication with said combustion chamber for receiving a heated HVOF stream therefrom comprising:*

*positioning a first layer of material in said nozzle with a thermal conductivity "x",*

*positioning a second layer of material in said nozzle in non-contacting relationship with first layer, said second layer having a thermal conductivity "y", wherein x<y,*

*heating said first layer so that said first layer contacts said second layer and said second layer removes heat from said first layer into said second layer whereupon said first layer returns to said non-contacting position.*

*24. The method of claim 23 wherein the first layer has a thermal expansion coefficient that is less than said second layer.*

*25. The method of claim 23 wherein said heating causes said first and second layers to cycle through a plurality of said non-contacting and contacting heat removal positions.*

*26. A combustion chamber for use with a high velocity oxygen fuel (HVOF) gun of a thermal spray apparatus and for generating a heated flow, the combustion chamber having a first layer of material heated by said heated flow, and a second layer of material which contacts said first heated layer of material, said first layer having a thermal conductivity lower than said second layer for spraying coatings with improved thermal efficiency and wear resistance, and wherein at room temperature, said first layer and said second layer are spaced apart from one another.*

*27. The combustion chamber of claim 26 wherein said first layer has a thermal expansion coefficient "a" and said second layer has a thermal expansion coefficient "b" wherein a<b.*

*28. The combustion chamber of claim 26 wherein said first layer and said second layer are spaced apart about 0.001-0.010 inches.*

*29. The combustion chamber of claim 26 wherein said spacing is about 0.002-0.006 inches.*

*30. The combustion chamber of claim 26 wherein said spacing is about 0.002-0.004 inches.*

*31. The combustion chamber of claim 26 wherein said spacing is about 0.002 inches.*

*32. The combustion chamber of claim 26 wherein said first layer is selected from the group consisting of stainless steel, nickel, a nickel based alloy, a ceramic material, and a mixture thereof, and said second layer is selected from the group consisting of copper, silver, aluminum, brass, bronze, and a mixture thereof.*

*33. The combustion chamber of claim 26 wherein said first layer has a hardness value of at least about 400 HV.*

*34. The combustion chamber of claim 26 wherein said second material which contacts said first heated layer removes heat from said first layer into said second layer.*

*35. A method for self-regulating heat losses from an HVOF thermal spray apparatus containing a combustion chamber and a nozzle downstream from and in flow communication with said combustion chamber for receiving a heated HVOF stream therefrom comprising:*

*positioning a first layer of material in said combustion chamber with a thermal conductivity "x",*

*positioning a second layer of material in said combustion chamber in non-contacting relationship with first layer, said second layer having a thermal conductivity "y", wherein x<y,*

*heating said first layer so that said first layer contacts said second layer and said second layer removes heat from said first layer into said second layer whereupon said first layer returns to said non-contacting position.*

*36. The method of claim 34 wherein the first layer has a thermal expansion coefficient that is less than said second layer.*

*37. The method of claim 34 wherein said heating causes said first and second layers to cycle through a plurality of said non-contacting and contacting heat removal positions.*

* * * * *